US006824873B2

(12) United States Patent
Hattori et al.

(10) Patent No.: US 6,824,873 B2
(45) Date of Patent: Nov. 30, 2004

(54) MODIFIED RAW CERAMIC POWDER SUITABLE FOR A MONOLITHIC CERAMIC ELECTRONIC COMPONENT

(75) Inventors: Koji Hattori, Shiga-ken (JP); Shinsei Okabe, Takatsuki (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 185 days.

(21) Appl. No.: 10/176,523

(22) Filed: Jun. 24, 2002

(65) Prior Publication Data

US 2003/0031871 A1 Feb. 13, 2003

(30) Foreign Application Priority Data

Jun. 22, 2001 (JP) .......................................... 2001-189948

(51) Int. Cl.[7] .......................... B32B 15/02; B32B 18/00
(52) U.S. Cl. ....................................... 428/403; 428/404
(58) Field of Search ................................. 428/403, 404

(56) References Cited

U.S. PATENT DOCUMENTS 6,205,015 B1 * 3/2001 Wada et al. ............. 361/321.4
6,303,529 B1 * 10/2001 Wada et al. ................. 501/137

FOREIGN PATENT DOCUMENTS

| JP | 05-089724 | 4/1993 |
| JP | 05-144319 | 6/1993 |
| JP | 10-139553 | 5/1998 |

* cited by examiner

Primary Examiner—Monique R. Jackson
(74) Attorney, Agent, or Firm—Dickstein, Shapiro, Morin & Oshinsky, LLP.

(57) ABSTRACT

A method for making a raw ceramic powder includes the steps of mixing and pulverizing a basic powder, a first organic metal compound containing a metallic element for modifying the electrical characteristics of the basic powder, a second organic metal compound containing a metallic element for improving the sinterability of the basic powder, and an organic solvent, to form a slurry, the first organic metal compound and the second organic metal compound being soluble in the organic solvent; removing the organic solvent from the slurry to obtain the basic powder, the surfaces of the particles of the basic powder being coated with the first organic metal compound and the second organic metal compound; and heat-treating the basic powder at a temperature higher than the decomposition temperature of the first organic metal compound and lower than the decomposition temperature of the second organic metal compound.

11 Claims, 2 Drawing Sheets

MODIFIED RAW CERAMIC POWDER SUITABLE FOR A MONOLITHIC CERAMIC ELECTRONIC COMPONENT

BACKGROUND OF THE INVENTION

1. Field of the Invention

The present invention relates to methods for making raw ceramic powders, the raw ceramic powders, dielectric ceramics produced using the raw ceramic powders, and monolithic ceramic electronic components using the dielectric ceramics.

2. Description of the Related Art

As monolithic ceramic capacitors have been miniaturized, the thickness of dielectric ceramic layers has been decreased to approximately 3 μm. Use of base metals, such as Cu and Ni, as materials for internal conductors, i.e., internal electrodes, has also been implemented. Recently, a further decrease in the thickness of layers has been achieved, and dielectric ceramic layers with a thickness of approximately 1 μm have been developed.

When dielectric materials for such monolithic ceramic capacitors are produced, various metallic elements are often added to the basic ceramic powder, such as a barium titanate powder, in order to modify electrical characteristics and to improve sinterability. Examples of known methods for adding such metallic elements to basic powders are as follows:

(1) A method in which carbonates or oxides of additive metallic elements, or the mixtures thereof, are added to a dielectric ceramic basic powder, mixing is performed, and then calcination is performed;

(2) A method in which an aqueous solution containing additive metallic elements is added to a slurry of a dielectric ceramic basic powder, precipitation is performed by adding a precipitant thereto, filtration and drying are performed, and then calcination is performed;

(3) A method in which a slurry is formed by adding a binder and a solution containing the compounds of additive metallic elements to a dielectric ceramic basic powder, green sheets are formed by a doctor blade process or the like, and then firing is performed (see Japanese Unexamined Patent Application Publication Nos. 5-89724 and 5-144319); and (4) A method in which a dielectric ceramic basic powder, an organic solvent and a surfactant are mixed and pulverized to form a slurry, a complex alkoxide solution containing additive metallic elements is added to the slurry, particles of the ceramic basic powder having surfaces coated with the complex alkoxide containing the additive metallic elements are obtained by removing the organic solvent, and then calcination is performed (see Japanese Unexamined Patent Application Publication No. 10-139553).

Since powders are mixed with each other in method (1), it is not possible to homogeneously disperse the carbonates or oxides of the additive metallic elements in the basic powder on the microscopic level. Therefore, the additive effect varies with the individual particles of the basic powder since the additive metallic elements segregate in the ceramic basic powder, and the variation in the characteristics of the ceramic electronic components is increased, and also it becomes difficult to obtain desired characteristics.

In method (2) described above, the dispersibility is not sufficient, although it is improved compared to method (1), and also it is not possible to coprecipitate a plurality of metal ions by one type of precipitant. For example, although it is possible to precipitate $Sr^{+2}$, $Ca^{+2}$ and $Mg^{+2}$ ions as complex carbonates by reaction with carbonate ions, it is not possible to precipitate $Ti^{+4}$ ions and the like as carbonates using carbonate ions.

Should a metal-free ammonium salt be used as the precipitant, precipitates cannot be generated since $Zn^{+2}$, $Mn^{+2}$, $Ni^{+2}$, $Co^{+2}$ ions and the like form soluble amine complexes.

In method (3) described above, the organic binder is gelated depending on the types of anions or cations present during the formation of the slurry because of an interaction with the ions, and therefore it may become impossible to homogeneously disperse the additives.

In method (4), the gelation of the binder can be suppressed because after the surfaces of the particles of the basic powder are coated with the complex alkoxide containing the additive metallic elements, calcination is performed, and then a binder solution is added thereto to form a slurry. However, during the calcination, both the compound of the metallic element added to modify the electrical characteristics and the compound of the metallic element for forming glass added to improve the sinterability are decomposed. The component for modifying the electrical characteristics preferentially reacts with the glass component, and as a result, it may not be possible to obtain a satisfactory characteristic modification effect, or the softening temperature of the glass may be changed and thereby its function as the sintering aid is not sufficiently carried out. The same problem also arises in methods (1) to (3) described above.

SUMMARY OF THE INVENTION

It is an object of the present invention to provide a raw ceramic powder and a method for making the raw ceramic powder in which a metal compound for modifying electrical characteristics (hereinafter referred to as an "electrical characteristic modifier") and a metal compound for improving sinterability (hereinafter referred to as a "sintering aid") are formed on the surfaces of the individual particles of a ceramic basic powder without impairing the functions as the electrical characteristic modifier and the sintering aid. It is another object of the present invention to provide a dielectric ceramic produced using the raw ceramic powder and a monolithic ceramic electronic component using the dielectric ceramic.

In one aspect of the present invention, a method for making a raw ceramic powder includes the steps of mixing and pulverizing a basic powder which is a principal ingredient of the raw ceramic powder, an organic solvent, a first organic metal compound which is soluble in the organic solvent and contains a metallic element for modifying the electrical characteristics of the basic powder, and a second organic metal compound which is soluble in the organic solvent and contains a metallic element for improving the sinterability of the basic powder to form a slurry; removing the organic solvent from the slurry to obtain the basic powder, the surfaces of the particles of the basic powder being coated with the first organic metal compound and the second organic metal compound; and then heat-treating the basic powder at a temperature higher than the decomposition temperature of the first organic metal compound but lower than the decomposition temperature of the second organic metal compound.

Preferably, a surfactant is added into the slurry. Also preferably, the first organic metal compound is at least one metal alkoxide, metal acetylacetonate ord metallic soap.

The second organic metal compound is preferably a complex metal alkoxide formed by the reaction of a silica sol, a metal acetate and a polyhydric alcohol.

In another aspect of the present invention, a raw ceramic powder includes a basic powder which is a principal ingredient of the raw ceramic powder, a first organic metal compound containing a metallic element for modifying the electrical characteristics of the basic powder, and a second organic metal compound containing a metallic element for improving the sinterability of the basic powder, the first organic metal compound and the second organic metal compound adhering to the surfaces of the particles of the basic powder, the basic powder being heat-treated at a temperature higher than the decomposition temperature of the first organic metal compound and lower than the decomposition temperature of the second organic metal compound.

Preferably, the basic powder is a $Ba_xTiO_{2+x}$ powder, wherein $1.00 \leq x \leq 1.03$. Preferably, the c-axis/a-axis ratio of the basic powder crystals is in the range of about 1.003 to 1.01. Also preferably, the basic powder has an average particle size of about 50 to 200 nm and a maximum particle size of about 300 nm or less.

In yet another aspect of the present invention, a dielectric ceramic is produced by firing the raw ceramic powder.

In another aspect of the present invention, a monolithic ceramic electronic component includes a laminate including a plurality of dielectric ceramic layers, and a plurality of internal electrodes extending along the predetermined interfaces between the dielectric ceramic layers, the internal electrodes being placed so as to form a capacitance between the two adjacent internal electrodes separated by one of the dielectric ceramic layers, the dielectric ceramic layers being composed of the dielectric ceramic described above.

Preferably, the internal electrodes contain a base metal as a principal ingredient. More preferably, the base metal is either nickel or a nickel alloy. Further, the dielectric ceramic layer placed between the two adjacent internal electrodes preferably, has a thickness of about 1 μm or less.

DESCRIPTION OF THE PREFERRED EMBODIMENTS

Figure 1:
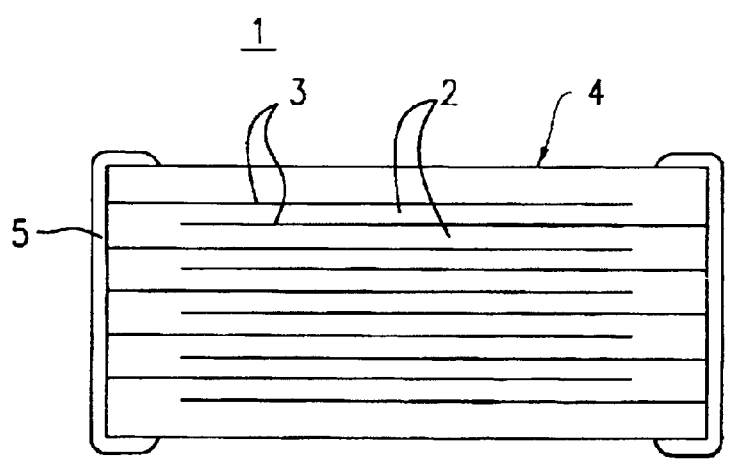
FIG. 1 is a sectional view of a monolithic ceramic capacitor according to an embodiment of the present invention.

In the present invention, a method for making a raw ceramic powder includes the steps of mixing and pulverizing the basic powder which is a principal ingredient of the raw ceramic powder, an organic solvent, a first organic metal compound which is soluble in the organic solvent and contains a metallic element for modifying the electrical characteristics of the basic powder, and a second organic metal compound which is soluble in the organic solvent and contains a metallic element for improving the sinterability of the basic powder to form a slurry; removing the organic solvent from the slurry to obtain the basic powder, the surfaces of the particles of the basic powder being coated with the first organic metal compound and the second organic metal compound; and then heat-treating the basic powder at a temperature higher than the decomposition temperature of the first organic metal compound and lower than the decomposition temperature of the second organic metal compound.

Examples of the metallic element for modifying the electrical characteristics include Co, Ni, Mn, Mg, Ba, Ca, Y and rare-earth elements, such as Ce, Nd, Er, and Dy. Examples of the metallic element for improving the sinterability include Li, Si, Ca, Ba, Sr and Ti.

In accordance with the method for making the raw ceramic powder of the present invention, first, by mixing and pulverizing the ceramic basic powder, the first and second organic metal compounds, and the organic solvent, a slurry is obtained in which the basic powder is finely pulverized and dispersed. If a surfactant is also mixed and pulverized therein, since the surfactant is adsorbed on the surfaces of the powder particles.

By removing the organic solvent from the slurry, the first and second organic metal compounds can adhere to the surfaces of the individual particles of the basic powder homogeneously.

By heat-treating the resultant powder at the temperature higher than the decomposition temperature of the first organic metal compound and lower than the decomposition temperature of the second organic metal compound, the first organic metal compound, i.e., the compound of the metallic element for modifying the electrical characteristics, is decomposed, dispersed and precipitated as fine particles on the surfaces of the particles of the basic powder. The decomposed first organic metal compound is also partially diffused into the surface layers of the particles of the basic powder. On the other hand, the second organic metal compound, i.e., the compound of the metallic element for improving the sinterability, is not decomposed and remains adhering homogeneously to the surfaces of the particles of the raw ceramic powder.

When a dielectric ceramic is produced using the raw ceramic powder thus obtained, the decomposed first organic metal compound is thermally diffused in the firing step, into the basic powder homogeneously, thereby improving the characteristics of the dielectric ceramic. At this stage, the second organic metal compound is decomposed to form a glass, at a predetermined sintering temperature, and thereby, sintering of the ceramic is accelerated.

The surfactant to be used is not particularly limited, and known surfactants may be used alone or in combination. Typical examples of surfactants include ionic surfactants, such as carboxylates, sulfonates, sulfuric ester salts, phosphoric ester salts, aliphatic amine salts and ammonium salts thereof, aromatic quaternary ammonium salts, and heterocyclic quaternary ammonium salts; nonionic surfactants, such as polyoxyethylene alkyl ethers, monodisperse polyoxyethylene secondary alcohol ethers, polyoxyethylene alkyl phenyl ethers, polyoxyethylene glycerin fatty acid esters, polyoxyethylene sorbitan fatty acid esters, polyoxyethylene glycol fatty acid esters, polypropylene glycol fatty acid esters, fatty acid alkanolamides, and polyoxyethylene alkylamines; and amphoteric surfactants, such as carboxybetaine, sulfobetaine, aminocarboxylates, and imidazoline derivatives.

As the first organic metal compound, preferably, at least one compound selected from the group consisting of metal alkoxides, metal acetylacetonates and metallic soaps can be used. With respect to the metal alkoxide, alkoxides each containing a single metallic element may be individually added to the basic powder or a complex alkoxide may be used. As the metallic soap, a known metallic soap, such as an octylate or a naphthenate, may be appropriately used.

As the second organic metal compound, preferably, a complex metal alkoxide formed by the reaction of a silica sol, a metal acetate and a polyhydric alcohol can be used. Such a complex metal alkoxide is more stable toward moisture in the air compared to an alkoxide containing a single metallic element, and thereby, insoluble compounds are prevented from being produced by hydrolysis. Therefore, the material is easy to handle.

By using a silica sol as a starting material for synthesizing the complex metal alkoxide, it is possible to avoid a change in the composition. That is, it is possible to avoid the shift in the composition between the feed stage and the final stage due to the volatilization and vaporization of the Si component which occurs when a compound having a low boiling point and high volatility, such as tetraethyl silicate, is used as a starting material.

Preferred examples of the second organic metal compound include a compound, such as a $Li_2O$—$BaO$—$SiO_2$-based compound, which contains the types and amounts of metallic elements capable of forming a glass which is transformed into the liquid phase at about 1,000° C. or less.

The raw ceramic powder of the present invention includes a basic powder, which is the principal ingredient of the raw ceramic powder, a first organic metal compound containing a metallic element for modifying the electrical characteristics of the basic powder, and a second organic metal compound containing a metallic element for improving the sinterability of the basic powder, the first organic metal compound and the second organic metal compound adhering to the surfaces of the particles of the basic powder, and the basic powder having being heat-treated at a temperature higher than the decomposition temperature of the first organic metal compound and lower than the decomposition temperature of the second organic metal compound.

As the base powder, a compound represented by the general formula $ABO_3$ may be used, wherein A is at least one divalent metal, for example, selected from the group consisting of Ba, Ca and Sr, and B is at least one tetravalent metal, for example, selected from the group consisting of Ti and Zr. A typical example thereof is a compound oxide having a tetragonal perovskite structure represented by $Ba_xTiO_{2+x}$, and, in particular, in order to obtain an oxide having a nonreducing tetragonal perovskite structure, the subscript x is preferably in the range of about 1.00 to 1.03. In order to improve ferroelectricity, i.e., to increase the dielectric constant, preferably, the c-axis/a-axis ratio of the crystal of the basic powder is in the range of about 1.003 to 1.01.

When the resultant raw ceramic powder is used as a dielectric material for a monolithic ceramic capacitor including dielectric ceramic layers having a thickness of 1 μm or less, the basic ceramic powder preferably, has an average particle size of about 50 to 200 nm and a maximum particle size of about 300 nm or less. If the average particle size is less than about 50 nm, reactivity with the additive ingredients is excessively increased and the particle size of the sintered dielectric ceramic increases excessively, resulting in an increase in the dielectric constant-temperature characteristics, which is not desirable. If the average particle size exceeds about 200 nm, reactivity with the additive ingredients is decreased, resulting in a difficulty in the modification of the characteristics. If the powder of the basic ceramic composition contains particles with a maximum particle size of more than about 300 nm, reliability is degraded when a dielectric ceramic is produced using the raw ceramic powder.

A dielectric ceramic of the present invention is produced by firing the raw ceramic powder.

A monolithic ceramic electronic component of the present invention includes a laminate including a plurality of dielectric ceramic layers, and a plurality of internal electrodes extending along the predetermined interfaces between the dielectric ceramic layers, the internal electrodes being placed so as to form a capacitance between the two adjacent internal electrodes separated by one (or more) of the dielectric ceramic layers, the dielectric ceramic layers being composed of the dielectric ceramic described above. The internal electrodes of the monolithic ceramic electronic component preferably contain nickel or a nickel alloy as a principal ingredient.

FIG. 1 is a sectional view which schematically shows a monolithic ceramic capacitor as an example of the monolithic ceramic electronic component of the present invention. A monolithic ceramic capacitor 1 includes a laminate 4 including a plurality of dielectric ceramic layers 2 and a plurality of internal electrodes 3 extending along the predetermined interfaces between the dielectric ceramic layers 2. The internal electrodes 3 are placed so that a capacitance is formed between the two adjacent internal electrodes 3 with one of the dielectric ceramic layers 2 therebetween.

External electrodes 5 are formed at both sides of the laminate 4. The external electrodes 5 are electrically connected to the specific internal electrodes 3. The internal electrodes 3 electrically connected to the external electrodes 5 at one side of the laminate 4 and the internal electrodes 3 electrically connected to the external electrodes 5 at the other side are alternately disposed in the laminate 4.

In the monolithic ceramic capacitor 1, the dielectric ceramic layers 2 are composed of a dielectric ceramic of the present invention.

Preferably, the internal electrodes 3 are composed of nickel or a nickel alloy as a principal ingredient in view of the cost. The external electrodes 5 may be formed, for example, by applying an Ag paste containing a $B_2O_3$—$Li_2O$—$SiO_2$—$BaO$-based glass frit to both sides of the laminate 4, followed by baking in a reducing atmosphere.

EXAMPLES (Synthesis of Second Organic Metal Compound which is Soluble in Organic Solvent and Contains Metallic Elements for Improving Sinterability)

First, as starting materials, lithium acetate, barium acetate, calcium acetate and strontium acetate were prepared and weighed so as to satisfy the molar ratios of the individual metal atoms shown in Table 1 below. The starting materials thus prepared were added into a beaker preliminarily containing trihydroxypropane (THP) as an organic solvent, and dissolution was performed by heating at 200° C., thus initiating a reaction. After the reaction was completed, the solution was cooled to room temperature, and a silica sol and titanium isopropoxide were added thereto so as to satisfy the molar ratios of the individual metal atoms shown in Table 1. Heating was then performed at 200° C. to produce a solution of the second organic metal compound.

Figure 2:
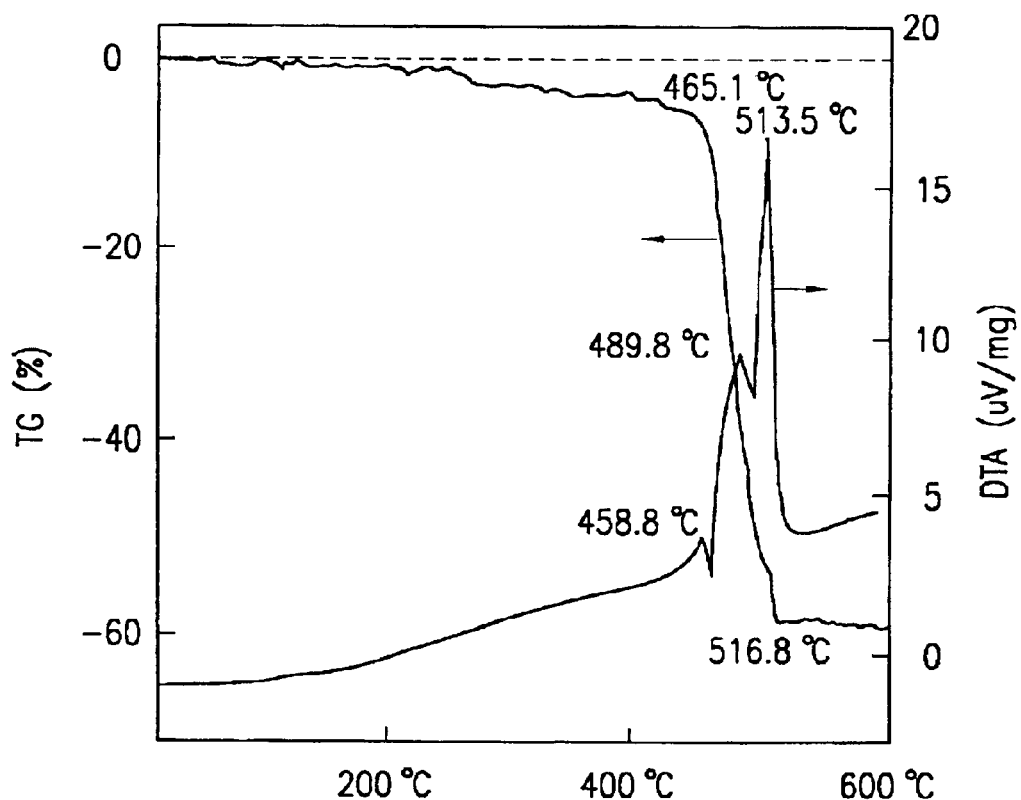
FIG. 2 is a TG-DTA chart showing the thermal decomposition temperature of an organic complex alkoxide according to an embodiment of the present invention.

In order to find the thermal decomposition temperature of the second organic metal compound thus obtained, thermal analysis was conducted by TG-DTA. The results thereof are shown in FIG. 2. As shown in the chart, the decomposition temperature of the second organic metal compound was approximately 465° C.

TABLE 1

| Si | Li | Ba | Ca | Sr | Ti |
|---|---|---|---|---|---|
| 1.00 | 1.20 | 0.16 | 0.12 | 0.12 | 0.08 |

(Production of Raw Ceramic Powder)

First, a $BaTiO_3$ powder as a basic powder, which was a principal ingredient of a raw ceramic powder, was formed by a hydrolysis method. The resultant powder had an average particle size of 19 nm, and by heat-treating this powder under various heat-treating conditions, $BaTiO_3$ powders having various average particle sizes and c-axis/a-axis ratios of the crystals were obtained as shown in Table 2. Powder particles aggregated during the heat treatment were pulverized after the heat treatment.

The particle size was measured using a scanning electron microscope. With respect to the c-axis/a-axis ratios of the crystals, X-ray diffraction analysis was performed, the results thereof were subjected to X-ray profile fitting using Rietveld analysis to determine lattice constants.

TABLE 2

| $BaTiO_3$ powder type | Heat-treating temperature (° C.) | Average particle size after heat treatment (nm) | c-axis/a-axis ratio |
|---|---|---|---|
| A | 600 | 63 | 1.003 |
| B | 800 | 85 | 1.006 |
| C | 900 | 117 | 1.008 |
| D | 1,000 | 146 | 1.009 |

Next, as the first organic metal compound which was soluble in the organic solvent and contained metallic elements for modifying the electrical characteristics, Mg, Mn, Dy and Ba octylate metallic soaps in the amounts of 1.0, 0.5, 2.0 and 1.0 moles, respectively, relative to 100 moles of $BaTiO_3$, were added to 50 g of each of the $BaTiO_3$ powders. The second organic metal compound previously obtained was further added thereto in the amount of 2% by weight, in terms of oxides, relative to $BaTiO_3$. The mixture thus obtained, 40 ml of toluene as an organic solvent, and 300 g of partially stabilized zirconia beads having a diameter of 2 mm, as a mixing medium, were placed in a 500 cc polyethylene pot, and mixing and pulverizing were performed for 8 hours.

The resultant slurry was transferred to a rotary evaporator and was set in a water bath of which temperature was retained at 70° C. The organic solvent was removed by distillation under a reduced pressure of 25 to 30 mmHg, and thereby a $BaTiO_3$ powder (basic powder), the surfaces of the particles of the powder being coated with the first and second organic metal compounds, was obtained for each type.

The $BaTiO_3$ powder thus obtained was heat-treated in an electric furnace at 200 to 500° C. to produce a raw ceramic powder of each type A-D.

Figure 3:
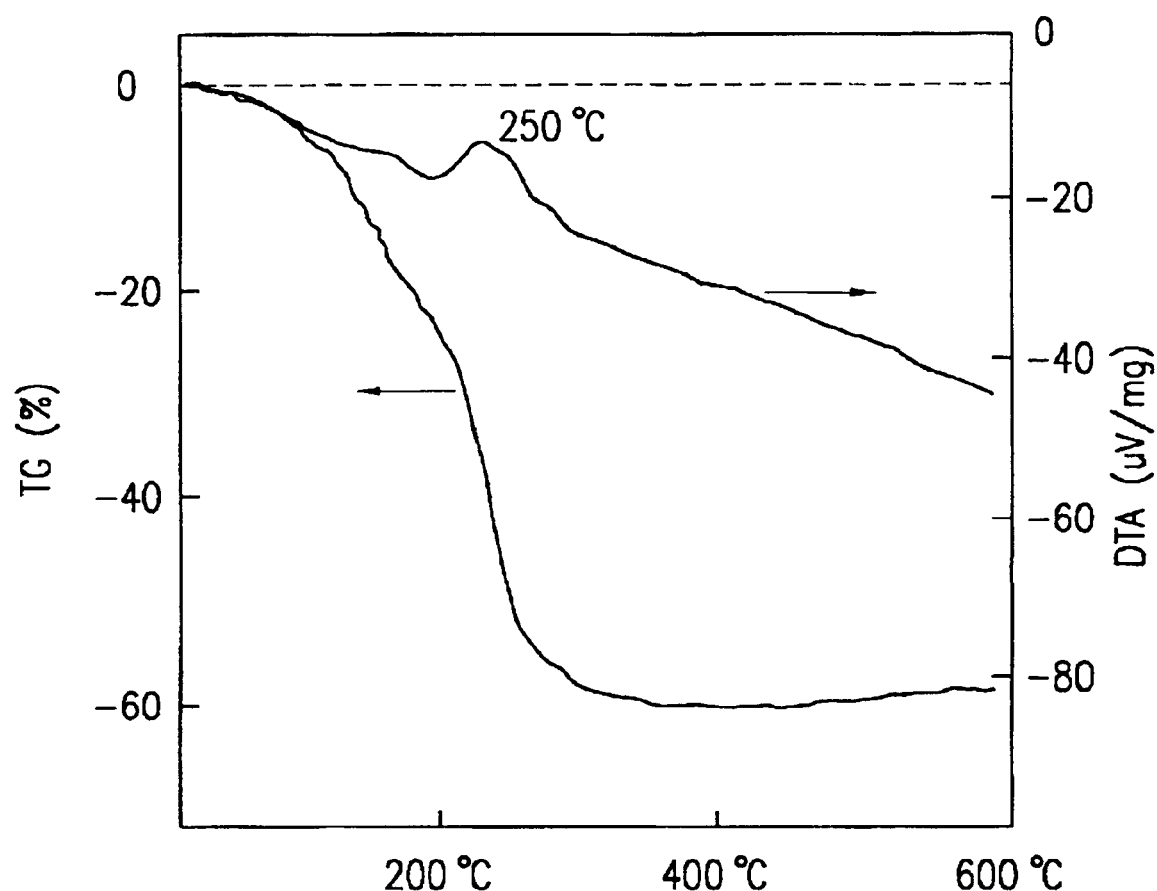
FIG. 3 is a TG-DTA chart showing the thermal decomposition temperature of a mixed solution containing octylate metallic soaps according to an embodiment of the present invention.

In order to check the thermal decomposition temperature of the octylate metallic soap (as the first organic metal compound), thermal analysis was conducted by TG-DTA. The results thereof are shown in FIG. 3. As shown in the chart, the decomposition temperature of the mixed solution containing the octylate metallic soaps was approximately 250° C.

(Fabrication of Monolithic Ceramic Capacitor and Evaluation of the Same)

A polyvinyl butyral-based binder (7.5% by weight relative to the raw ceramic powder), a plasticizer (2.5% by weight relative to the raw ceramic powder), and toluene (twice the volume of the raw ceramic powder) were added to the raw ceramic powder, and mixing and dispersing were performed for 16 hours in a 500 cc polyethylene pot, to which 300 g of partially stabilized zirconia beads having a diameter of 2 mm, as a mixing medium, was also added, to produce a ceramic slurry. The ceramic slurry was formed into sheets by a doctor blade process, and rectangular green sheets with a thickness of 0.8 μm were thus produced. Next, a conductive paste containing nickel as a principal ingredient was printed on the green sheets to form conductive paste films for constituting internal electrodes.

A plurality of ceramic green sheets thus obtained were laminated in such a manner that the edges at which the conductive past layers were exposed alternately faced different sides of the laminate. The laminate was heated at 350° C. in a $N_2$ atmosphere to remove the binder, and then firing was performed at 930 to 990° C. for 2 hours in a reducing atmosphere comprising gases of $H_2$, $N_2$, and $H_2O$ having an oxygen partial pressure of 10-9 to 10-12 MPa.

A silver paste containing a $B_2O_3$—$Li_2O$—$SiO_2$—$BaO$-based glass frit was applied to both sides of the sintered laminate, and baking was performed in a $N_2$ atmosphere at 600° C., and thereby external electrodes electrically connected to the internal electrodes was formed.

The monolithic ceramic capacitors thus obtained had outer dimensions in which the width was 5.0 mm, the length was 5.7 mm and the thickness was 2.4 mm, and the dielectric ceramic layers interposed between the internal electrodes had a thickness of 0.5 μm. The total number of the effective dielectric ceramic layers was 5, and the area of the counter electrode per layer was $16.3 \times 10^{-6}$ $m^2$.

Next, electrical characteristics were measured with respect to 100 test pieces for each sample. The number of test pieces of which characteristics were unable to be evaluated due to short-circuiting, etc. was counted, and a defect rate was calculated.

The capacitance (C) and the dielectric loss (tan δ) were measured using an automatic bridge-type meter in accordance with JIS C5101-10, and the dielectric constant (∈) was computed based on the capacitance measured.

Using an insulation resistance tester, the insulation resistance (R) at 25° C. was measured by applying a DC voltage of 5 V for 2 minutes, and the resistivity was calculated.

With respect to the rate of change in capacitance with temperature, the rate of change to the capacitance at 20° C. (ΔC/C20) in the range of −25° C. to +85° C. and the rate of change to the capacitance at 25° C. (ΔC/C25) in the range of −55° C. to +125° C. were measured.

In order to measure the breakdown voltage, a DC voltage was applied at a voltage-increasing rate of 100 V/sec.

In a high-temperature load test, the change in insulation resistance (R) with time was measured for each test piece while a DC voltage of 5 V was being applied at 150° C., and the point at which the insulation resistance (R) reached $10^5$ Ω or less was defined as failure. The average life to reach failure was measured.

The results thereof are shown in Tables 3 and 4. In Tables 3 and 4, the asterisked samples are out of the range of the present invention.

TABLE 3

| Sample No. | BaTiO₃ powder type | Heat-treating temperature (° C.) | Firing temperature (° C.) | Defect rate (%) | Resistivity (Ω · cm) |
|---|---|---|---|---|---|
| 1 | A | 300 | 950 | 1 | 13.0 |
| 2 | B | 300 | 950 | 0 | 13.1 |
| 3 | C | 300 | 950 | 5 | 13.1 |
| 4 | D | 300 | 950 | 9 | 13.2 |
| *5 | B | 200 | 950 | 84 | 11.1 |
| 6 | B | 400 | 950 | 0 | 13.1 |
| *7 | B | 500 | 950 | 0 | 13.1 |
| 8 | B | 400 | 930 | 0 | 12.8 |
| 9 | B | 400 | 960 | 0 | 13.1 |
| 10 | B | 400 | 990 | 3 | 13.0 |

TABLE 4

| Sample No | Dielectric constant | Dielectric loss (%) | Rate of change in capacitance with temperature | | Breakdown voltage (kV/mm) | Average life (hr) |
|---|---|---|---|---|---|---|
| | | | 85° C.(%) | 125° C.(%) | | |
| 1 | 1,210 | 2.6 | −9.8 | −14.0 | 81 | 85 |
| 2 | 1,170 | 2.8 | −9.7 | −13.8 | 88 | 91 |
| 3 | 1,310 | 2.5 | −9.5 | −13.8 | 84 | 101 |
| 4 | 1,870 | 2.4 | −9.4 | −13.7 | 77 | 86 |
| *5 | — | — | — | — | — | — |
| 6 | 1,170 | 2.7 | −9.5 | −14.0 | 88 | 90 |
| *7 | 960 | 3.1 | −8.2 | −28.6 | 65 | 10 |
| 8 | 1,140 | 3.1 | −9.8 | −15.0 | 91 | 76 |
| 9 | 1,200 | 2.7 | −9.6 | −13.8 | 85 | 88 |
| 10 | 1,510 | 2.4 | −9.8 | −14.7 | 81 | 86 |

As in the case of the sample No. 5, where the heat treatment was performed at 200° C., which is lower than the decomposition temperature (250° C.) of the first metal compound which was soluble in the organic solvent and which contained the metallic elements for modifying the electrical characteristics of the basic powder, structural defects occurred in the dielectric ceramic component when it was fired due to gases generated as the organic ingredients in the organic metal compound were decomposed, and metallic particles of the internal electrodes entered the defects, and thereby short-circuiting occurred easily.

In the case of the sample No. 7, in which heat treatment was performed at 500° C. which was higher than the decomposition temperature (465° C.) of the second organic metal compound which was soluble in the organic solvent and which contained the metallic elements for improving the sinterability of the basic powder, the first organic metal compound and substances produced by the decomposition of the second organic compound which was added for the purpose of low-temperature sintering form a glass phase and dissolution in the basic powder was not performed sufficiently, resulting in an increase in the rate of change in capacitance with temperature and a decrease in the average life.

In contrast, sample Nos. 1 to 4, 6, and 8 to 10 which were in the range of the present invention, had a defect rate which was low, and the monolithic ceramic capacitors demonstrated superior electrical characteristics, such as the rate of change in capacitance with temperature and the average life.

As is obvious from the above-mentioned description, it is possible to provide a raw ceramic powder in which a metal compound for modifying electrical characteristics (electrical characteristic modifier) and a metal compound for improving sinterability (sintering aid) are formed on the surfaces of the individual particles of a ceramic basic powder without impairing the functions as the electrical characteristic modifier and the sintering aid in accordance with the method for making the raw ceramic powder of the present invention.

By using such a raw ceramic powder, even when dielectric ceramic layers are thin with a thickness of 1 μm or less, it is possible to fabricate a monolithic capacitor as the monolithic ceramic electronic component without any problems. Therefore, miniaturized monolithic ceramic capacitors with large capacitances can be fabricated with high reliability.

What is claimed is:

1. A modified raw ceramic powder comprising:

a raw ceramic powder comprising a plurality of particles;

a metal-containing electrical characteristic modifier adhering to the surfaces of the particles of said powder; and an organic metal compound which is heat decomposable to a metal-containing sintering aid adhering to the surfaces of the particles of said powder.

2. A modified raw ceramic powder according to claim 1, wherein the ceramic powder comprises $Ba_xTiO_{2+x}$, wherein $1.00 \leq x \leq 1.03$.

3. A modified raw ceramic powder according to claim 2, wherein the c-axis/a-axis ratio of crystals of the ceramic powder is in the range of about 1.003 to 1.01.

4. A modified raw ceramic powder according to claim 1, wherein the ceramic powder has an average particle size of about 50 to 200 nm and a maximum particle size of about 300 nm or less.

5. A modified raw ceramic powder according to claim 1, wherein the organic metal compound is a complex metal alkoxide reaction product of a silica sol, a metal acetate and a polyhydric alcohol.

6. A modified raw ceramic powder according to claim 1, wherein the organic metal compound is capable of forming a glass which is transformed into the liquid phase at about 1,000° C. or less.

7. A modified raw ceramic powder according to claim 1, wherein the raw ceramic powder is a dielectric raw ceramic powder.

8. A modified raw ceramic powder according to claim 1, wherein the raw ceramic powder comprises $Ba_xTiO_{2+x}$, wherein $1.00 \leq x \leq 1.03$, the c-axis/a-axis ratio of crystals of which is in the range of about 1.003 to 1.01, and the average particle size of which is about 50 to 200 nm with a maximum particle size of about 300 nm or less.

9. A a modified raw ceramic powder according to claim 8, wherein the organic metal compound is a complex metal alkoxide reaction product of a silica sol, a metal acetate and a polyhydric alcohol.

10. A modified raw ceramic powder according to claim 8, wherein the organic metal compound is capable of forming a glass which is transformed into the liquid phase at about 1,000° C. or less.

11. A modified raw ceramic powder according to claim 8, wherein the raw ceramic powder is a dielectric raw ceramic powder.

* * * * *